United States Patent [19]

Dachiku et al.

[11] Patent Number: 5,274,443
[45] Date of Patent: Dec. 28, 1993

[54] MOVING PICTURE IMAGE ENCODER WITH CONTINUOUSLY CHANGING QUANTIZATION STEP SIZE

[75] Inventors: Kenshi Dachiku, Tokyo; Hideyuki Ueno, Fujisawa; Toshiaki Watanabe, Yokohama, all of Japan

[73] Assignee: Kabushiki Kaisha Toshiba, Kawasaki, Japan

[21] Appl. No.: 832,449

[22] Filed: Feb. 7, 1992

[30] Foreign Application Priority Data

Feb. 8, 1991 [JP] Japan .................. 3-017376

[51] Int. Cl.[5] .................. H04N 7/137; H04N 7/133
[52] U.S. Cl. .................. 358/136; 358/133
[58] Field of Search .............. 358/136, 105, 135, 133; 375/27, 30

[56] References Cited

U.S. PATENT DOCUMENTS

| | | | |
|---|---|---|---|
| 4,352,191 | 9/1982 | Un .................. | 375/30 |
| 4,683,494 | 7/1987 | Furukawa .................. | 358/136 |
| 4,831,439 | 5/1989 | Fedele et al. .................. | 358/136 |
| 4,833,535 | 5/1989 | Ozeki et al. | |
| 4,862,173 | 8/1989 | Nishitani .................. | 358/135 |
| 4,897,855 | 1/1990 | Acampora .................. | 358/136 |
| 4,951,140 | 8/1990 | Ueno .................. | 358/105 |
| 5,038,209 | 8/1991 | Hang .................. | 358/136 |
| 5,072,295 | 12/1991 | Murakami .................. | 358/136 |
| 5,113,256 | 5/1992 | Citta .................. | 358/136 |
| 5,136,377 | 8/1992 | Johnston .................. | 358/136 |

OTHER PUBLICATIONS

H. Takahashi, "Noise Reducer", *The Journal of the Institute of Television Engineers of Japan*, vol. 33 No. 4, Apr. 1979, pp. 296(40)–300(44).

Tanaka et al, "Processing Frame Difference Signals for Detection of Moving Areas", *ITEJ Technical Report* TEBS112-1 (Jul. 27, 1986).

*Primary Examiner*—Tommy P. Chin
*Assistant Examiner*—Bryan S. Tung
*Attorney, Agent, or Firm*—Oblon, Spivak, McClelland, Maier & Neustadt

[57] ABSTRACT

A moving picture image encoding device comprises a DCT circuit for coding an input image signal, a quantization circuit for quantizing an output signal of the DCT circuit, a variable length coding circuit for coding an output signal of the quantization circuit, a buffer memory for temporarily storing codes output from the variable length coding circuit, and a quantization control circuit for controlling the quantization step size according to the buffer content of the buffer memory. The quantization control circuit decrements the quantization step size by a predetermined quantity every frame period or increments the quantization step size by a predetermined quantity every block period when a parameter value related to the buffer content is not less than a preset value.

22 Claims, 4 Drawing Sheets

MOVING PICTURE IMAGE ENCODER WITH CONTINUOUSLY CHANGING QUANTIZATION STEP SIZE

BACKGROUND OF THE INVENTION

1. Field of the Invention

The present invention relates to a moving picture image encoding device which encodes a moving picture image signal for transmission at a fixed transmission rate.

2. Description of the Related Art

Progress is being made in the development of videophone and teleconferencing with a background of the preparation of digital communications networks and the advance of digital communications technologies. One of the most important technologies of realizing the videophone and the teleconferencing is moving picture image encoding.

A moving picture image encoding device is disclosed in, for instance, U.S. Pat. No. 4,951,140. In this moving picture image encoding device, an interframe difference signal between image signals of one-frame before and after, which are input on a frame-by-frame basis, is produced and then subjected to discrete cosine transform in a DCT (discrete cosine transform) circuit. DCT coefficient data output from the DCT circuit is quantized by a quantization circuit and then coded by a variable-length coding circuit. Codes output from the variable-length coding circuit are temporarily stored in a buffer memory. The contents of the buffer memory are read at a fixed transmission rate and sent to a transmission line.

The quantization step size of the quantization circuit is controlled according to the quantity of codes stored in the buffer memory so that the buffer memory will not overflow. That is, when the buffer content of the buffer memory is not less than a preset value, the quantization step size is made large, thereby decreasing the quantity of codes generated from the variable-length coding circuit. When the buffer content is less than the preset value, the quantization step size is made small, thereby increasing the quantity of codes from the coding circuit. The occurrence of underflow of the buffer memory can be prevented by storing dummy data in the buffer memory.

In this way, the quantization step size of the quantization circuit is feedback-controlled so that the buffer content may fall below a predetermined value. The feedback control may cause an oscillatory phenomenon in which the quantization step size varies at short intervals. In case where the oscillatory phenomenon occurs, the quality of a picture reproduced at the decoding side will vary with time. That is, the picture quality deteriorates.

SUMMARY OF THE INVENTION

It is an object of the present invention to provide a moving picture image encoding device which permits the buffer content to fall below a preset value without causing a great variation of the quality of a picture reproduced by a decoder.

According to the present invention, an input image signal is coded by a first coding circuit and then quantized in accordance with a variable quantization step size by a quantization circuit. An output signal of the quantization circuit is variable-length coded by a second coding circuit and the resultant codes are temporarily stored in a buffer memory. The quantization step size is controlled by a quantization control circuit according to the quantity of codes stored in the buffer memory. The quantization control circuit decrements the quantization step size by a first unit quantity every a first unit time or increments the quantization step size by a second unit quantity every a second unit time shorter than the first unit time when a parameter value related to the quantity of codes stored in the buffer memory is not less than a preset value.

In the present invention, the quantization step size is decremented every the first unit time in the steady state. When the parameter value related to the buffer content becomes equal to or more than the preset value, the quantization step size is incremented every the second unit time shorter than the first unit time. In this case, if the first unit time is selected to be a relatively long period, for example, one frame period of the input image signal, the variation of the quantization step size in the steady state is reduced. Thereby, the variation of the quality of a reproduced picture is also reduced. If the second unit time is selected to be a relatively short period, for example, one block period, on the other hand, the quantization step size can be incremented immediately when the parameter value becomes equal to or larger than the preset value and thus the quantity of codes generated is decreased rapidly. Thereby, the buffer content can be kept within the preset value, preventing the buffer memory from overflowing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
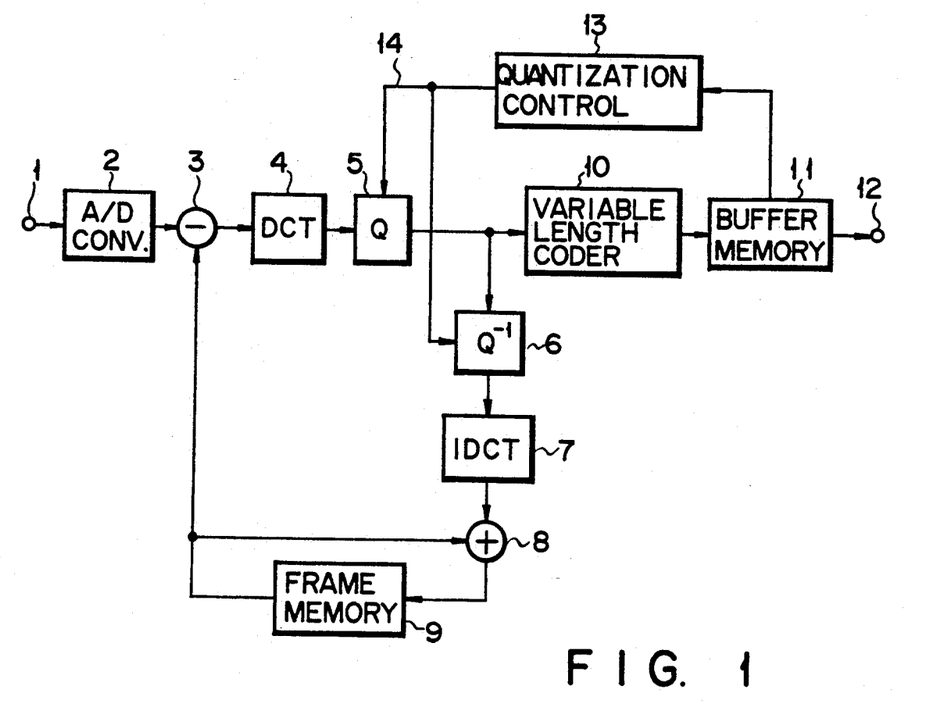
FIG. 1 is a block diagram of a moving picture image encoding device according to an embodiment of the present invention.

Referring now to FIG. 1, a moving picture image encoding device embodying the present invention comprises an A/D converter (analog to digital converter) 2, a subtracter 3, a DCT (discrete cosine transform) circuit 4, a quantization circuit 5, an inverse quantization circuit 6, an inverse DCT circuit 7, an adder 8, a frame memory 9, a variable-length coding circuit 10, a buffer memory 11 and a quantization control circuit 13. The quantization control circuit 13 is a circuit which is adapted to generate quantization step size data 14 in order to control the quantization step size of the quantization circuit 5 according to the buffer content of the buffer memory 11. That is, as described later, the quantization control circuit performs non-linear feedback control to vary an interval of time (period) at which the quantization step size is varied according to whether or not the buffer content is not less than a preset value.

Next, the operation of the moving picture image encoding device of the present embodiment will be described. A moving picture image signal is applied to an input terminal 1 in frame units. The image signal is first converted to a digital signal by the A/D converter 2. The subtracter 3 produces an interframe difference signal by subtraction of a digital image signal corresponding to each frame and an image signal of one-frame before stored in the frame memory 9. The interframe difference signal is subjected to discrete cosine transform in blocks of, for example, 8×8 pixels by the DCT circuit 4. The discrete cosine transform is also called the DCT coding and used to eliminate correlation between pixels. The DCT circuit 4 outputs DCT coefficient data as coded data. The DCT coefficient data is quantized by the quantization circuit 5. The quantized data is variable-length coded by the variable length coder 10. Codes output from the variable length coder are temporarily stored in the buffer memory 11. The codes stored in the buffer memory 11 are read at a fixed transmission rate for transmission to a transmission line not shown.

The quantized signal from the quantization circuit 5 is also applied to the inverse quantization circuit 6 which performs the inverse of the operation of the quantization circuit 5, i.e., the inverse quantization. To this end, a quantization step size data 14 is applied from the quantization control circuit 13 to the inverse quantization circuit 6. An output signal of the inverse quantization circuit 6 is subjected to the inverse discrete cosine transform in the IDCT circuit 7. The adder 8 adds an output signal of the IDCT circuit 7 and an image signal of one-frame before from the frame memory 9, thereby outputting a local decoded signal. The local decoded signal is stored in the frame memory 9 and used to obtain an interframe difference signal with an image signal corresponding to the next frame.

In the above process of moving picture image coding, the quantity of codes (which is referred to as the buffer content) stored in the buffer memory 11 varies according to the quantity of codes generated in the moving picture image coding, that is, the quantity of codes output from the variable length coder 10. At this point, in order to prevent the buffer memory 11 from overflowing, the quantization control circuit 13 controls the quantization step size of the quantization circuit 5 by means of the non-linear feedback control. To be specific, the quantization control circuit 13 decrements the quantization step size by a first unit quantity every a first unit time. In addition, the quantization control circuit 13 compares the buffer content of the buffer memory 11 with a suitable preset value and, when the buffer content is equal to or larger than the preset value, increments the quantization step size by a second unit quantity every a second unit time which is shorter than the first unit time. The first unit time is selected to be, for example, the time for one frame of image signals (the frame period). The second unit time is selected to be, for example, the time for one block of image signals (the block period).

In this way, the quantization step size is decremented slowly at a speed corresponding to the frame period in the steady state where the buffer content is less than the preset value, so that the step size does not vary greatly. This prevents variations of the reproduced picture quality at the decoding side. On the other hand, when the scene changes or an object in the scene makes a large movement, the quantity of codes output from the variable length coding circuit 10 increases. From this it follows that the buffer content increases and reaches the preset value. Then, the quantization step size will be made large in a short time at a speed corresponding to the block period. Thereby, the quantity of codes output from the variable length coding circuit 10 is reduced rapidly, so that the buffer memory 11 is prevented from overflowing. The buffer memory 11 can be prevented from underflowing by storing dummy data in it.

Figure 2:
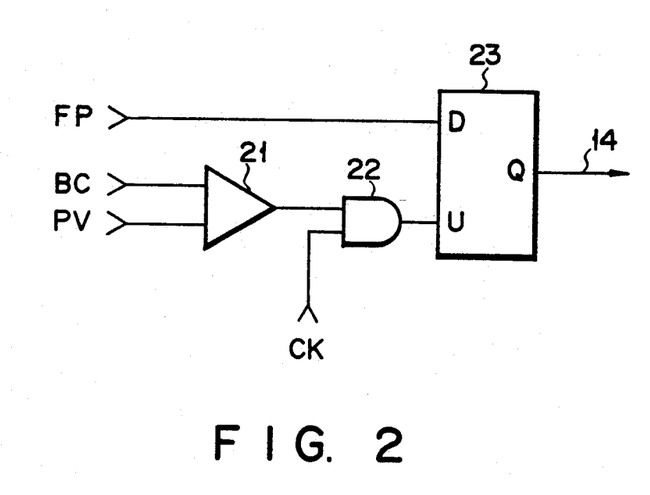
FIG. 2 is a block diagram illustrating an arrangement of the quantization control circuit of FIG. 1.

FIG. 2 shows an arrangement of the quantization control circuit 13. In this arrangement, the quantization control circuit comprises a comparator 21, an AND gate 22 and an up-down counter 23. The comparator makes a comparison between the buffer content (BC) of the buffer memory 11 of FIG. 1 and the preset value (PV). The AND gate 22 is responsive to the output of the comparator to control the passage of clock pulses CK with the block period. The up-down counter 23 has a terminal D connected to receive frame pulses (FP) with the frame period and a terminal U connected to receive the clock pulses CK with the block period from the AND gate 22. The up-down counter 23 is responsive to each pulse at the terminal D to count down and to each pulse at the terminal U to count up. The quantization step size data 14 is output from an output terminal Q of the up-down counter 23 to the quantization circuit 5 of FIG. 1, thereby controlling the quantization step size of the quantization circuit 5.

The up-down counter 23, in the steady state where the buffer content BC of the buffer memory 11 is less than the preset value PV, is responsive to the frame pulse FP to count down with each frame, so that its output, i.e., the quantization step size data 14 is decremented by the first unit quantity with each frame. When the buffer content BC becomes equal to or more than the preset value PV, the output of the comparator 21 goes high, allowing the clock pulses CK with the block period to pass through the AND gate 22. As a result, the up-down counter 23 counts up with each of the clock pulses CK and its output, i.e., the quantization step size data 14 is incremented by the second unit quantity with each block. The first and second unit quantities are determined by the number of bits of the up-down counter 23. In this case, the first and second unit quantities are made equal to each other.

Figure 3:
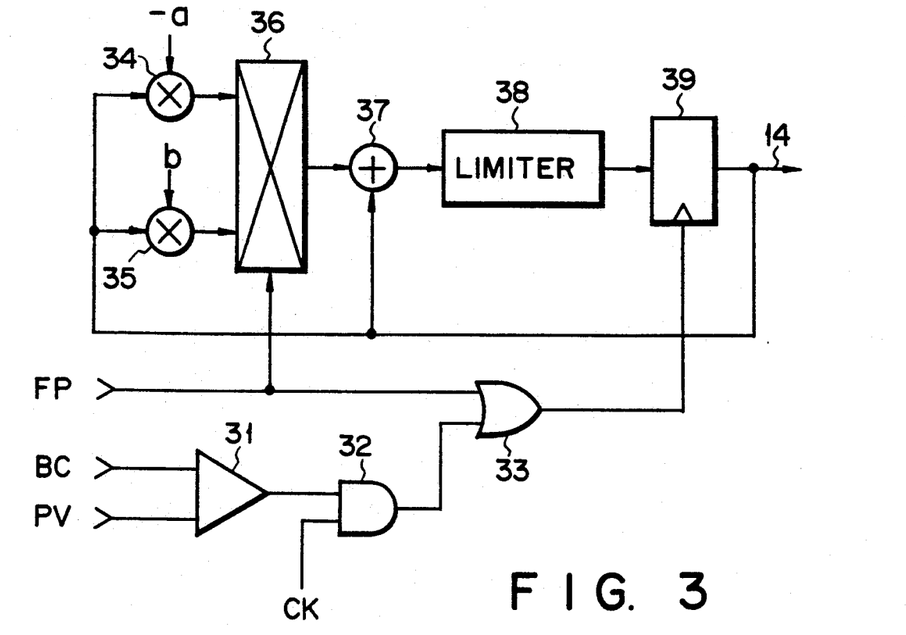
FIG. 3 is a block diagram illustrating another arrangement of the quantization control circuit of FIG. 1.

FIG. 3 shows another arrangement of the quantization control circuit 13, which comprises a comparator 31, an AND gate 32, an OR gate 33, multipliers 34 and 35, a selector 36, an adder 37, a limiter 38 and a register 39. The comparator 31 and the AND gate 32 operate in the same manner as the comparator 21 and the AND gate 22, respectively, of FIG. 2.

According to the quantization control circuit of FIG. 3, the variations (increment and decrement) of the quantization step size can be changed according to the current quantization step size (before variation). The multipliers 34 and 35 multiply the current quantization step size 14 by coefficients "−a" and "b", respectively. The coefficients "a" and "b" each indicate a positive constant. When supplied with the frame pulses FP, the selector 36 selects the output of the multiplier 34. Otherwise, it selects the output of the multiplier 35. The output of the selector 36 is added to the current quantization step size data 14 in the adder 37. The output value of the adder 37 is limited by the limiter 38 so that it will not exceed the upper or lower limit value of the quantization step size. The output of the limiter 38 is applied to the register 39.

When the frame pulse FP is applied, a value is held in the register 39 which corresponds to the sum of the output of the multiplier 34 and the current quantization step size data, output from the adder 37, and is limited by the limiter 38. The value held in the register 39 is output as the quantization step size data 14. Thereby, the quantization step size is incremented by a quantity corresponding to the product of the preceding quantization step size and the coefficient "a". When the buffer content BC becomes equal to or more than the preset value PV, the output of the comparator 31 allows the AND gate 32 to pass the clock pulses CK with the block period, which are, in turn, applied to the register 39 via the OR gate 33. Thereby, the content of the register 39 is replaced with a value which corresponds to the sum of the output of the multiplier 35 and the preceding quantization step size data, output from the adder 37, and is limited by the limiter 38. As a result, the quantization step size is incremented by a quantity corresponding to the product of the preceding quantization step size and the coefficient "b".

As described above, the decrement value of the quantization step size with each frame when the buffer content is less than the preset value PV corresponds to a value obtained by multiplying the preceding quantization step size by the coefficient "a". The larger the current quantization step size, the larger this value becomes. On the other hand, the increment value of the quantization step size with each block when the buffer content BC is equal to or more than the preset value PV corresponds to a value obtained by multiplying the preceding quantization step size by the coefficient "b". In this case as well, the larger the current quantization step size, the larger this value becomes.

Therefore, when, for example, an object in the image stops moving, the quantization step size will become small enough in a short time corresponding to several frame periods, permitting a picture with good definition to be obtained rapidly. Moreover, when the quantization step size becomes small, its variation can be suppressed well and the deterioration of recording picture quality due to the variation of the picture quality can be suppressed. Furthermore, when the object in the image begins moving or moves actively, the quantization step size will become larger in a short time, thus surely preventing the buffer memory 11 from overflowing.

Figure 4:
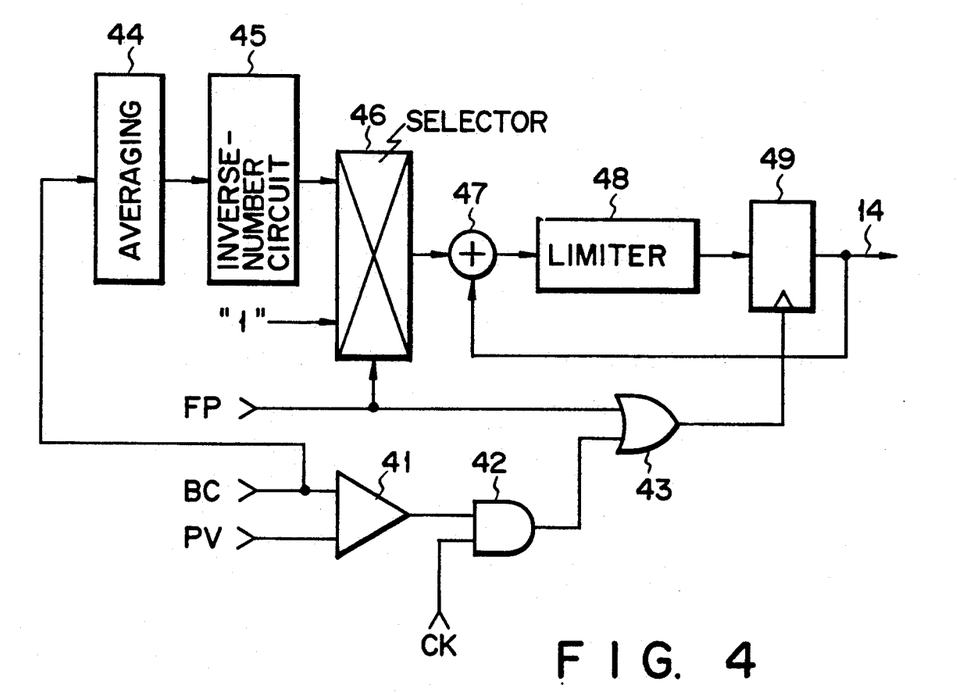
FIG. 4 is a block diagram illustrating still another arrangement of the quantization control circuit of FIG. 1.

FIG. 4 illustrates still another arrangement of the quantization control circuit. This quantization control circuit is arranged to greatly decrement the quantization step size when the preceding frame is a still picture and comprises a comparator 41, an AND gate 42, an OR gate 43, an averaging circuit 44, an inverse-number circuit 45, a selector 46, an adder 47, a limiter 48 and a register 49. The comparator 41, the AND gate 42, the OR gate 43, the adder 47, the limiter 48 and the register 49 are the same as corresponding ones shown in FIG. 3.

The averaging circuit 44 calculates the time-average value of the buffer content BC, and the inverse-number circuit 45 obtains the reciprocal of the time-average value of the buffer content. The selector 46 is responsive to application of the frame pulse FP thereto to select the output of the inverse-number circuit 45. When no frame pulse is applied, the selector 46 selects a "1". As in the case of FIG. 3, the output of the selector 46 is added to the preceding quantization step size 14 in the adder 47, and the output of the adder is limited by the limiter 48 so that it will not exceed the upper and lower limit values of the quantization step size and then entered into the register 49.

When the frame pulse FP is applied, the register 49 holds a value obtained by limiting the sum of the reciprocal of the one-frame average of the buffer content BC and the preceding quantization step size data. The value held in the register 49 is output as the quantization step size data 14. Thereby, when the object in the image is regarded as still, the quantization step size is decremented greatly. That is, when the object in the image stops moving, the quantization step size becomes small enough, so that a picture with good definition can be obtained rapidly.

On the other hand, when the buffer content BC becomes equal to or more than the preset value PV, the comparator 41 allows the clocks C with the block period to pass through the AND gate 42 and enter the register 49 via the OR gate 43. Thereby, the content of the register 49 is replaced with a value obtained by adding a 1 to the preceding quantization step size in the adder 47 and limiting the sum in the limiter 48, and the quantization step size is incremented by one.

Although, in FIGS. 2 through 4, the quantization control circuit 13 is implemented with specific hardware, it is also possible to implement the same processing as is performed by the circuits of FIGS. 2 through 4 with software by using microprocessor for the quantization control circuit. As an example, in FIG. 5 there is illustrated a flowchart for an algorithm for implementing the function of the circuit of FIG. 3 with software.

Figure 5:
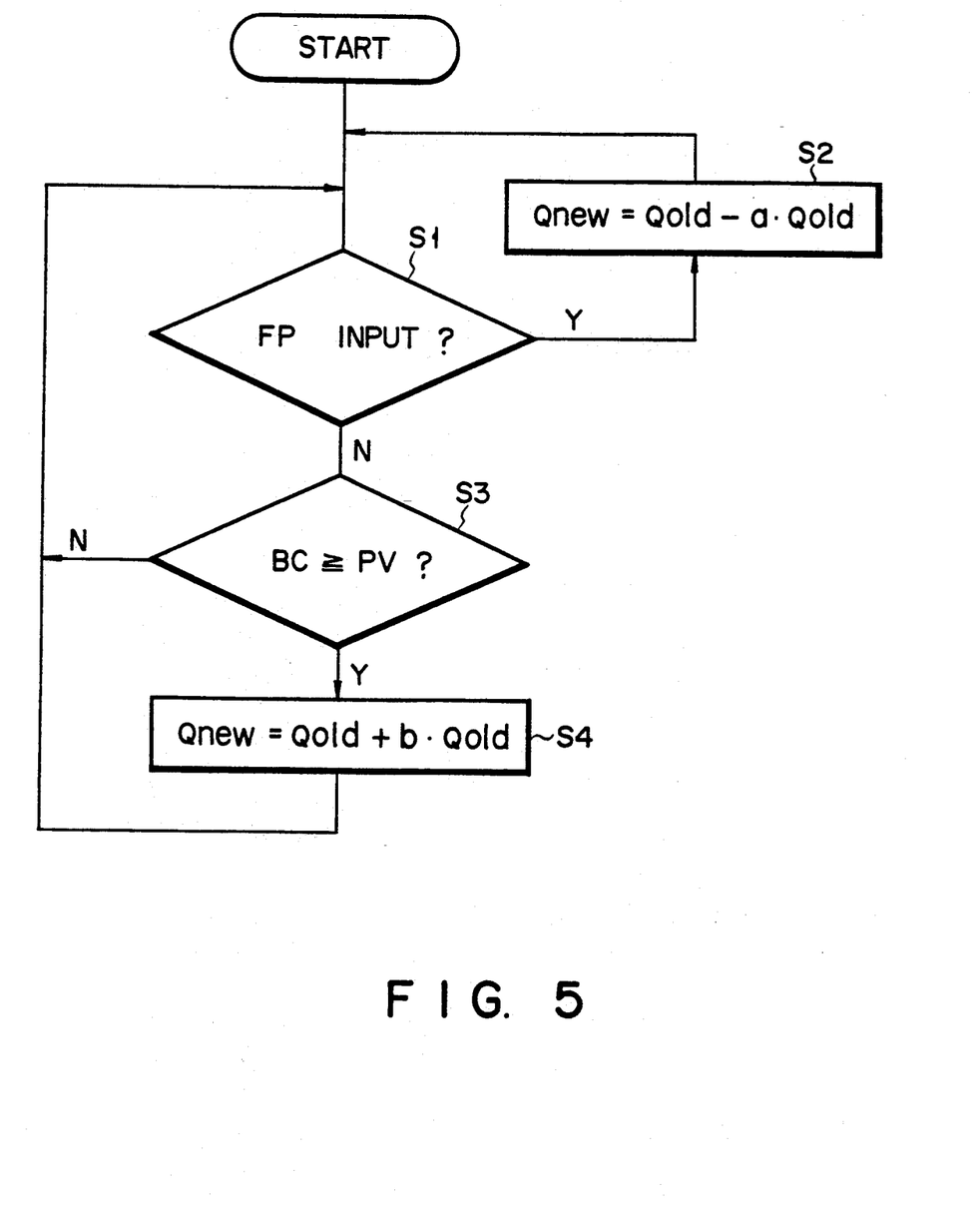
FIG. 5 is a flowchart for an algorithm for implementing the quantization control circuit of FIG. 1 with software.

In the algorithm shown in FIG. 5, the presence or absence of entry of the frame pulse FP is monitored continually (step S1). When a frame pulse FP is entered, the new quantization step size Qnew is decremented in step S2 as follows:

$$Qnew = Qold - a \times Qold \quad (1)$$

where Qold indicates the preceding quantization step size and a is a positive constant.

During a period of time when no frame pulse is entered, a check is made, for each block, as to whether or not the buffer content BC is less than the preset value PV (step S3). When the buffer content BC falls below the preset value PV, the new quantization step size is incremented in step S4 as follows:

$$Qnew = Qold + b \times Qold \quad (2)$$

where b is a positive constant.

The time interval (the first unit time) at which the quantization step size is decremented is not necessarily required to be one frame period. It may be, for example, half of one frame period or several frame periods. Also, the time interval (the second unit time) at which the quantization step size is incremented is not required to be one block period and may be, for example, several block periods.

Figure 6:
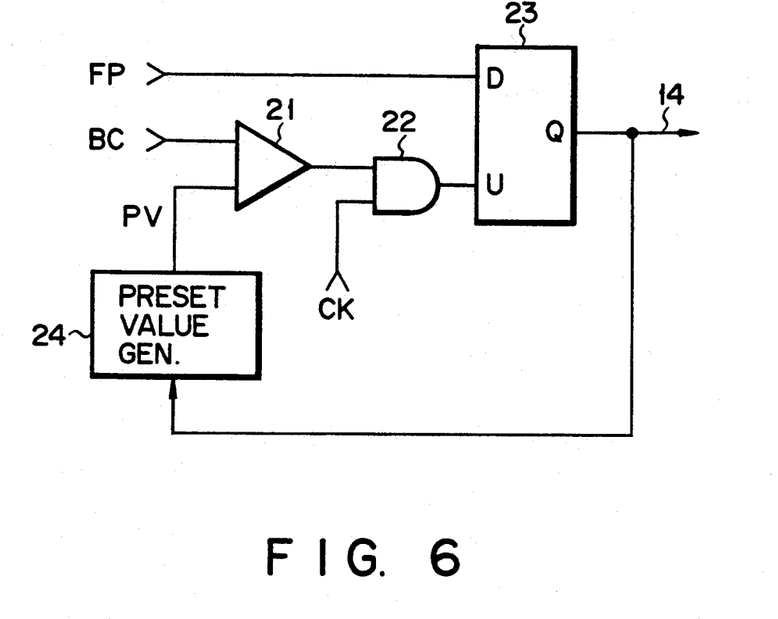
FIG. 6 is a block diagram illustrating a further arrangement of the quantization control circuit of FIG. 1.

FIG. 6 illustrates a further arrangement of the quantization control circuit 13. In this arrangement, a preset value generator 24 for generating a variable preset value PV is added to the quantization control circuit shown in FIG. 2. The preset value generator 24 is controlled by the quantization step size data 14, so that the preset value PV to be generated varies with the quantization step size. That is, the preset value PV is made large in the steady state where the quantization step size is relatively small, thus making it difficult for the quantization step size to become large even if the buffer content is increased. Conversely, when the quantization step size is relatively small, the preset value PV is made large, thus making it easy for the quantization step size to become small. Therefore, the quantization control circuit of FIG. 6 can enhance the effects of prevention of variations of picture quality due to suppression of variations of the quantization step size in the steady state and prevention of overflow of the buffer memory 11 when the buffer content BC exceeds the preset value PV.

Figure 7:
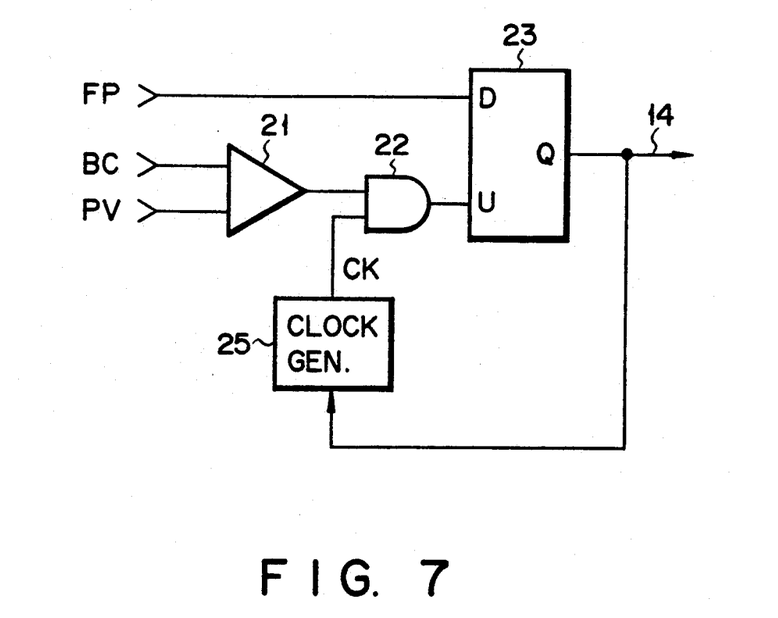
FIG. 7 is a block diagram illustrating a still further arrangement of the quantization control circuit of FIG. 1.

FIG. 7 illustrates a still further arrangement of the quantization control circuit 13. A clock generator 25 is provided which generates clocks CK with a variable period. The clock generator 25 is controlled by the quantization step size data 14 in such a way that the smaller the quantization step size, the period of the clocks CK becomes longer. This arrangement permits variations of the quantization step size in the steady state where it is small to be suppressed more effectively, thereby preventing variations of picture quality.

Although, in the examples of the quantization control circuit 13 described above, a comparison is made between he buffer content BC and the preset value PV, use may be made of any other parameter if it is related to the buffer content BC. Such parameters include, for example, (a) the residual capacity of the buffer memory 11, (b) the quantity of increase of the buffer content BC, (c) the quantity of codes generated within a block or a fixed time, (d) a parameter of a image signal prior to coding (for example, the variance of an input image signal), etc.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A moving picture image encoding device comprising:

first coding means for coding an input image signal;
quantization means for quantizing an output signal of said first coding means in accordance with a variable quantization step size;
second coding means for variable-length coding an output signal of said quantization means to output codes;
storage means for temporarily storing said codes output from said second coding means; and
control means for controlling said quantization step size according to the quantity of codes stored in said storage means, said control means changing said quantization step size at least each time a predetermined period of time lapses, said control means decrementing said quantization step size by a first unit quantity every first unit of time when a parameter value related to the quantity of codes stored in said storage means is less than a present value, and incrementing said quantization step size by a second unit quantity every second unit of time which is shorter than said first unit of time when said parameter value related to the quantity of codes stored in said storage means is greater than said present value.

2. A device according to claim 1, wherein said first coding means includes means for producing an interframe difference of said input image signal and means for orthogonal transform coding said interframe difference.

3. A device according to claim 1, wherein said control means includes comparator means for making a comparison between said parameter value and said present value and quantization step size data generating means responsive to said comparator means for generating quantization step size data which is decremented by said first unit quantity every said first unit of time or incremented by said second unit quantity every said second unit of time when said parameter value is not less than said present value.

4. A device according to claim 3, wherein said quantization step size generating means includes gate means responsive to said comparator means for controlling the passage of a pulse signal with a period corresponding to said second unit of time and counter means responsive to a pulse signal with a period corresponding to said first unit of time to count down or responsive to said pulse signal passing through said gate means to count up, thereby outputting quantization step size data.

5. A device according to claim 1, wherein said control means includes comparator means for making a comparison between said parameter value and said preset value and quantization step size data generating means responsive to said comparator means for generating quantization step size data which is decremented by a first unit quantity corresponding to a current quantization step size every said first unit of time or incremented by a second unit quantity every said second unit of time when said parameter value is not less than said present value.

6. A device according to claim 1, wherein said control means includes comparator means for making a comparison between said parameter value and said present value and quantization step size data generating means responsive to said comparator means for generating quantization step size data which is decremented by a first unit quantity every said first unit of time or incremented by a second unit quantity corresponding to a current quantization step size every said second unit of time when said parameter value is not less than said preset value.

7. A device according to claim 1, wherein said control means includes comparator means for making a comparison between said parameter value and said preset value and quantization step size data generating means responsive to said comparator means for generating quantization step size data which is decremented by a first unit quantity corresponding to a current quantization of step size every said first unit of time or incremented by a second unit quantity corresponding to the current quantization step size every of said second unit of time when said parameter value is not less than said present value.

8. A device according to claim 7, wherein said quantization step size data generating means comprises first gate means for controlling the passage of a pulse signal with a period corresponding to said second unit of time; second gate means for ANDing and output signal of said first gate means and a pulse signal with a period corresponding to said first unit of time to output a pulse signal; first and second multiplication means for multiplying a current quantization step size data by a first negative coefficient and a second positive coefficient, respectively; selector means for selecting output data of said first multiplication means when said pulse signal with a period corresponding to said first unit of time is applied or output data of said second multiplication means except when said pulse signal is applied; adder means for adding output data of said selector means and said current quantization step size data; limiter means for limiting upper and lower limit values of output data of said adder means; and data holding means for holding output data of said limiter means at times when said pulse signal with a period corresponding to said first unit of time is applied to thereby output said quantization step size data.

9. A device according to claim 1, wherein said control means comprises comparator means for making a comparison between a parameter value related to the quantity of codes stored in said storage means and said present value; average value calculating means for calculating the average value of said parameter value; reciprocal calculating means for calculating the reciprocal of the average value calculated by said average value calculating means; selector means for selecting output data of said reciprocal calculating means when a pulse signal with a period corresponding to said first unit of time is applied or data with a fixed value except when said pulse signal is applied; adder means for adding output data of said selector means and a current quantization step size data; limiter means for limiting upper and lower limit values of output data of said adder means; and data holding means for holding output data of said limiter means at times when said pulse signal with a period corresponding to said first unit of time is applied to thereby output said quantization step size data.

10. A device according to claim 1, wherein said control means includes means for varying said preset value according to said quantization step size.

11. A device according to claim 1, wherein said control means includes means for varying the period corresponding to said second unit of time according to said quantization step size.

12. A moving picture image encoding device comprising:
first coding means for coding an image signal, input in frame units, on a block-by-block basis;
quantization means for quantizing an output signal of said first coding means in accordance with a variable quantization step size;
second coding means for variable-length coding an output signal of said quantization means, thereby generating codes;
storage means for temporarily storing said codes generated by said second coding means; and
control means for controlling said quantization step size according to the quantity of codes stored in said storage means, said control means changing said quantization step size at least each time a predetermined period of time lapses, said control means decrementing said quantization step size by a first unit quantity every first unit of time corresponding to the frame period when a parameter value related to the quantity of codes stored in said storage means is less than a present value, and incrementing said quantization step size by a second unit quantity every second unit of time corresponding to the block period when said parameter value related to the quantity of codes stored in said storage means is greater than a preset value.

13. A device according to claim 12, wherein said control means comprises comparator means for making a comparison between a parameter value related to the quantity of codes stored in said storage means and a present value and quantization step size data generating means responsive to said comparator means for generating quantization step size data which is decremented by a first unit quantity every said first unit of time or incremented by a second unit quantity every said second unit of time when said parameter value is not less than said preset value.

14. A device according to claim 12, wherein said control means comprises comparator means for making a comparison between a parameter value related to the quantity of codes stored in said storage means and a preset value and quantization step size data generating means responsive to said comparator means for generating quantization step size data which is decremented by a first unit quantity corresponding to a current quantization step size every said first unit of time or incremented by a second unit quantity every said second unit of time when said parameter value is not less than said preset value.

15. A device according to claim 12, wherein said control means comprises comparator means for making a comparison between a parameter value related to the quantity of codes stored in said storage means and a preset value and quantization step size data generating means responsive to said comparator means for generating quantization step size data which is decremented by a first unit quantity every said first unit of time or incremented by a second unit quantity corresponding to a current quantization step size every said second unit of time when said parameter value is not less than said preset value.

16. A device according to claim 12, wherein said control means includes comparator means for making a comparison between a parameter value related to the quantity of codes stored in said storage means and a preset value and quantization step size data generating means responsive to said comparator means for generating quantization step size data which is decremented by a first unit quantity corresponding to a current quantization step size every said first unit of time or incremented by a second unit quantity corresponding to a current quantization step size every said second unit of time when said parameter value is not less than said preset value.

17. A device according to claim 12, wherein said control means comprises comparator mans for making a comparison between a parameter value related to the quantity of codes stored in said storage means and a present value; average value calculating means for calculating the average value of said parameter value; reciprocal calculating means for calculating the reciprocal of the average value calculated by said average value calculating means; selector means for selecting output data of said reciprocal calculating means when a pulse signal with a period corresponding to said first unit time is applied or data with a fixed value except when said pulse signal is applied; adder means for adding output data of said selector means and current quantization step size data; limiter means for limiting upper and lower limit values of output data of said adder means; and data holding means for holding output data of said limiter means at times when said pulse signal with a period corresponding to said first unit of time is applied to thereby output quantization step size data.

18. A moving picture image encoding method comprising the steps of:
   coding an image signal input in frame units;
   quantizing a coded signal in accordance with a variable quantization step size;
   variable-length coding a quantized output signal to output codes;
   temporarily sorting said codes; and
   controlling said quantization step size according to the quantity of codes stored by changing said quantization step size at least each time a predetermined period of time lapses, said quantization step size being decremented by a first unit quantity every first unit of time when a parameter value related to the quantity of the temporarily stored output codes is less than a preset value and incrementing said quantization step size by a second unit quantity every second unit of time which is shorter than said first unit of time when the parameter value related to the quantity of said temporarily stored output code is greater than said preset value.

19. A method according to claim 18, wherein said predetermined period of time is equal to said first unit of time.

20. A device according to claim 1, wherein said predetermined period of time is equal to said first unit of time.

21. A device according to claim 12, wherein said predetermined period of time is equal to said first unit of time.

22. A moving picture image encoding device comprising:
   first coding means for coding an input image signal;
   quantization means for quantizing an output signal of said first coding means in accordance with a variable quantization step size;
   second coding means for variable-length coding an output signal of said quantization means to output codes;
   storage means for temporarily storing said codes output from said second coding means; and
   control mans for controlling said quantization step size according to the quantity of codes stored in said storage means, said control means changing said quantization step size at least each time a predetermined period of time lapses, said control means decrementing said quantization step size when a parameter value related to the quantity of codes stored in said storage means is less than a preset value and incrementing said quantization step size when said parameter value related to the quantity of codes stored in said storage means is greater than said preset value, a rate of decrementing said quantization step size having an absolute value which is less than an absolute value of a rate at which said quantization step is incremented.

* * * * *